US012638577B2

(12) United States Patent (10) Patent No.: US 12,638,577 B2
Hayase et al. (45) Date of Patent: May 26, 2026

(54) ARITHMETIC DEVICE AND ARITHMETIC METHOD

(71) Applicant: Hitachi Astemo, Ltd., Hitachinaka (JP)

(72) Inventors: Shigenori Hayase, Tokyo (JP);
Michihiko Ikeda, Hitachinaka (JP);
Tatsuhiko Monji, Hitachinaka (JP)

(73) Assignee: HITACHI ASTEMO, LTD.,
Hitachinaka (JP)

( * ) Notice: Subject to any disclaimer, the term of this
patent is extended or adjusted under 35
U.S.C. 154(b) by 661 days.

(21) Appl. No.: 17/916,644

(22) PCT Filed: Feb. 1, 2021

(86) PCT No.: PCT/JP2021/003609
§ 371 (c)(1),
(2) Date: Oct. 3, 2022

(87) PCT Pub. No.: WO2021/205722
PCT Pub. Date: Oct. 14, 2021

(65) Prior Publication Data
US 2023/0146620 A1 May 11, 2023

(30) Foreign Application Priority Data
Apr. 10, 2020 (JP) ................................. 2020-070839

(51) Int. Cl.
*G01S 13/931* (2020.01)
*G01S 7/53* (2006.01)
(Continued)

(52) U.S. Cl.
CPC .............. *G01S 13/931* (2013.01); *G01S 7/53*
(2013.01); *G01S 13/726* (2013.01);
(Continued)

(58) Field of Classification Search
CPC ........ G01S 13/931; G01S 7/53; G01S 13/726;
G01S 15/931; G01S 17/86; G01S 17/931;
G01S 7/539; G01S 15/66; G08G 1/166
See application file for complete search history.

(56) References Cited

U.S. PATENT DOCUMENTS 5,999,877 A 12/1999 Takahashi et al.
2004/0054473 A1 3/2004 Shimomura
(Continued)

FOREIGN PATENT DOCUMENTS

JP H-10-154292 A 6/1998
JP 2004-112144 A 4/2004
(Continued)

OTHER PUBLICATIONS

International Search Report with English Translation and Written
Opinion dated Apr. 13, 2021 in corresponding International Appli-
cation No. PCT/JP2021/003609.

*Primary Examiner* — Ig T An
(74) *Attorney, Agent, or Firm* — Foley & Lardner LLP

(57) ABSTRACT

An arithmetic device includes: an input unit to which
information pertaining to a detection target that is a target
recognized by a sensor is input from the sensor; a process-
ing-unit allocation unit that is configured to allocate a
plurality of the targets to any one of a plurality of groups; an
association unit that is configured to retrieve a second one of
the targets to be associated with a first one of the targets from
a part of the plurality of groups included in the plurality of
groups; and a state fusion unit that is configured to fuse the
first target and the second target that have been associated
with each other by the association unit to produce a tracking
target that is a target being tracked. The first target is any one
of the detection target and the tracking target. The second
target is any one of the detection target and the tracking
target.

10 Claims, 11 Drawing Sheets

(51) Int. Cl.

| | | |
|---|---|---|
| *G01S 13/72* | (2006.01) | |
| *G01S 15/931* | (2020.01) | |
| *G01S 17/86* | (2020.01) | |
| *G01S 17/931* | (2020.01) | |
| *G08G 1/16* | (2006.01) | |

(52) U.S. Cl.
CPC ............ *G01S 15/931* (2013.01); *G01S 17/86* (2020.01); *G01S 17/931* (2020.01); *G08G 1/166* (2013.01)

(56) References Cited

U.S. PATENT DOCUMENTS

| | | | |
|---|---|---|---|
| 2014/0139361 A1* | 5/2014 | Arnold ..................... G08G 1/04 340/942 | |
| 2016/0014406 A1 | 1/2016 | Takahashi et al. | |
| 2017/0315229 A1* | 11/2017 | Pavek ................... G01S 13/931 | |
| 2019/0221121 A1* | 7/2019 | Guo ........................ H04W 4/46 | |
| 2019/0265714 A1* | 8/2019 | Ball ..................... G05D 1/0223 | |
| 2019/0294889 A1* | 9/2019 | Sriram ............... G06V 10/7625 | |
| 2019/0378423 A1* | 12/2019 | Bachrach ............... H04L 67/12 | |

FOREIGN PATENT DOCUMENTS

| | | |
|---|---|---|
| JP | 2016-29557 A | 3/2016 |
| JP | 2018-55427 A | 4/2018 |
| JP | 2019-125368 A | 7/2019 |

\* cited by examiner

ARITHMETIC DEVICE AND ARITHMETIC METHOD

TECHNICAL FIELD

The present invention relates to an arithmetic device and an arithmetic method.

BACKGROUND ART

In an in-vehicle driving assistance system, it is necessary to recognize external situations in order to control or assist in traveling of a host vehicle. Thus, it is necessary to install a plurality of sensors in the host vehicle, process data obtained from the plurality of sensors in a sensor information fusion processing unit, and recognize states such as positions, speed, and the like of three-dimensional objects including other vehicles and pedestrians. To respond to various situations, it is necessary to increase the number of sensors installed in the host vehicle. It is also necessary to increase the number of surrounding targets that are to be recognized. However, as the number of sensors and the number of targets increase, the sensor information fusion processing unit has increased loads for recognition processing of the external situations. PTL 1 discloses a target detection system for a vehicle that includes sensor un its each installed at a predetermined location of a vehicle, and a central control unit connected to the sensor units via in-vehicle bus. The sensor units each include a sensor that detects targets around the vehicle, and a sensor control unit that creates target information of each of the targets detected by the sensor, and that transmits the target information to the central control unit via the in-vehicle bus. Each of the sensor control units is configured to determine in which one of a plurality of areas, which are obtained by dividing a region around the vehicle, each of the targets detected by the sensor exists, calculate a priority of each of the targets on the basis of scores set for the areas, and transmit the target information of a target having a high priority to the central control unit while being configured not to transmit the target information of a target having a low priority to the central control unit, and is configured to change size of a part of the areas in accordance with a traveling speed of the vehicle.

CITATION LIST

Patent Literature

PTL 1: JP 2018-055427 A

SUMMARY OF INVENTION

Technical Problem

In the invention described in PTL 1, there is room for consideration in accelerating the processing.

Solution to Problem

An arithmetic device according to a first aspect of the present invention includes: a reception unit to which information pertaining to a detection target that is a target recognized by a sensor is input from the sensor; a processing-unit allocation unit that is configured to allocate a plurality of the targets to any one of a plurality of groups; an association unit that is configured to retrieve a second one of the targets to be associated with a first one of the targets from a part of the plurality of groups included in the plurality of groups; and a state fusion unit that is configured to fuse the first target and the second target that have been associated with each other by the association unit to produce a tracking target that is a target being tracked. The first target is any one of the detection target and the tracking target. The second target is any one of the detection target and the tracking target.

An arithmetic method according to a second aspect of the present invention is an arithmetic method performed by an arithmetic device including a reception unit to which information pertaining to a detection target that is a target recognized by a sensor is input from the sensor. The method includes: allocating a plurality of the targets to any one of a plurality of groups; retrieving a second one of the targets to be associated with a first one of the targets from a part of the plurality of groups included in the plurality of groups; and fusing the first target and the second target that have been associated with each other by the association unit to produce a tracking target that is a target being tracked. The first target is any one of the detection target and the tracking target. The second target is any one of the detection target and the tracking target.

Advantageous Effects of Invention

According to the present invention, processing can be accelerated.

DESCRIPTION OF EMBODIMENTS

First Embodiment

Hereinafter, a first embodiment of an arithmetic device will be described with reference to FIGS. 1 to 4.

Figure 1:
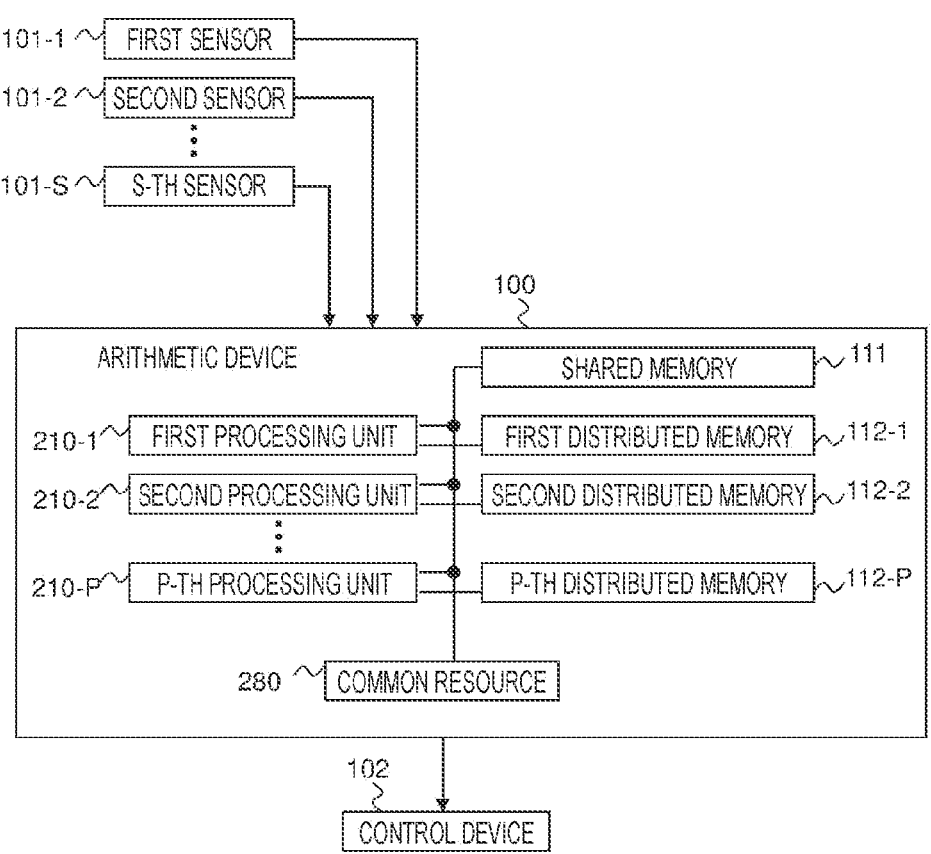
FIG. 1 is a hardware configuration diagram of an arithmetic device.

FIG. 1 is a hardware configuration diagram of an arithmetic device 100. The arithmetic device 100 is mounted on a vehicle (hereinafter referred to as a "host vehicle"), which is not illustrated, and is connected to at least one sensor 101 and a control device 102. The arithmetic device 100 includes at least one processing unit 210, at least one distributed memory 112, a shared memory 111, and a common resource

280. Note that the at least one sensor 101, the at least one processing unit 210, and the at least one distributed memory 112 include one or more sensors 101, one or more processing units 210, and one or more distributed memories 112, respectively, and these components are represented by branch numbers. The sensors 101 include a first sensor 101-1, a second sensor 101-2, and an S-th sensor 101-S. Examples of the sensor include a camera sensor, a radar sensor, a light detection and ranging (LIDAR) sensor, and a sonar sensor. The processing units 210 include a first processing unit 210-1, a second processing unit 210-2, and a P-th processing unit 210-P. The distributed memories 112 include a first distributed memory 112-1, a second distributed memory 112-2, and a P-th distributed memory 112-P.

The configuration number S of sensors 101 is independent of the configuration number of components other than the sensors 101. The configuration number P of processing units 210 is the same as the configuration number P of distributed memories 112. That is, the processing units 210 and the distributed memories 112 exist at a ratio of 1:1. The P processing units 210 can perform processing simultaneously in parallel.

The processing unit 210 is, for example, a plurality of central processing units (CPUs), a plurality of arithmetic processing cores mounted on a single CPU, a pseudo-plurality of arithmetic processing cores in which a single arithmetic processing core performs a plurality of arithmetic operations substantially simultaneously in a time division manner, or the like. The processing unit 210 may be realized by using one or a plurality of general purpose computing on graphics processing units (GPGPU) and one or a plurality of field programmable gate arrays (FPGAs). The processing unit 210 may be realized by combining a CPU, a GPGPU, and an FPGA.

Each of the processing units 210 is connected to a high-speed accessible, dedicated, corresponding one of the distributed memories 112. For example, the first processing unit 210-1 can access the first distributed memory 112-1 at high speed, and the second processing unit 210-2 can access the second distributed memory 112-2 at high speed. For example, although it is not impossible for the first processing unit 210-1 to access the second distributed memory 112-2, the access is made at low speed because the first processing unit 210-1 accesses the second distributed memory 112-2 via the second processing unit 210-2.

In the present embodiment, a distributed memory 112 that is accessible at high speed from a corresponding one of the respective processing units 210 and that is dedicated to the corresponding processing unit 210 is referred to as a "dedicated distributed memory", and the distributed memory 112 other than the dedicated distributed memory is referred to as the "other connected distributed memory". For example, the dedicated distributed memory of the first processing unit 210-1 is the first distributed memory 112-1, and all the distributed memories 112 other than the first distributed memory 112-1, including, for example, the second distributed memory 112-2, are other connected distributed memories when the first processing unit 210-1 is a reference unit. The dedicated distributed memory of the second processing unit 210-2 is the second distributed memory 112-2. In the present embodiment, the level of access speed to a memory includes the level of transfer speed and the level of delay. That is, a case in which a memory can be accessed at high speed includes a case in which transfer speed is high and a case in which delay is small.

The shared memory 111 can be accessed from each of the processing units 210 at substantially the same speed. However, the access speed to the shared memory 111 is slower than the access speed to the dedicated distributed memory. Thus, in the present embodiment, each of the processing units 210 mainly uses a corresponding, dedicated distributed memory thereof.

The common resource 280 is, for example, a CPU. However, the common resource 280 may be realized by hardware common to the processing unit 210.

The sensor 101 detects a state of a detection target existing in an external environment of the host vehicle. Targets are various detection objects such as another vehicle, a pedestrian, and a sign. Among these targets, a target detected by the sensor 101 is referred to as the detection target. Among the targets, a target that is being tracked, that is, being subjected to tracking, as described later, is referred to as a "tracking target". In other words, the target is a superordinate concept of the detection target and the tracking target. The state of the target is at least one of a position of the target, speed of the target, acceleration of the target, a yaw rate of the target, a value indicating other movement pertaining to the target, or a type of the target. However, in the first embodiment, the state of the target always includes the position of the target. The sensor 101 outputs the state of the detection target to the arithmetic device 100. The sensor 101 has ability to detect a plurality of targets, and thus the number of detection targets input from the sensor 101 to the arithmetic device 100 may be zero or one, or may be plural, depending on external situations of the host vehicle.

The arithmetic device 100 processes information pertaining to a detection target input from the sensor 101 by using parallel processing in which P processing units 210 are used, to update information pertaining to a tracking target. The tracking target is a target being tracked by the arithmetic device 100, and is also a target detected by the sensor 101 in the past. That is, the "state of the detection target" and the "state of the tracking target" are the same kind of information. Hereinafter, processing in which a tracking target is updated to output the state of the tracking target to the control device 102 is referred to as "estimation processing". A cycle of performing the estimation processing is referred to as a "processing cycle".

The estimation processing performed by the processing unit 210 is as follows. First, using a detection target detected by the sensor 101 and the state of a tracking target detected in the previous processing cycles and being tracked by the arithmetic device 100, the state of an external target in the current processing cycle is estimated to update the state of the tracking target. The processing unit 210 also estimates the state of the tracking target in the next processing cycle by using the updated state of the tracking target. The estimation processing performed by the processing unit 210 is as described above. Note that an output unit 204 of the arithmetic device 100 outputs the state of the tracking target updated by the processing unit 210 to the control device 102. The control device 102 that has received this output controls acceleration, deceleration, steering or the like of the host vehicle. Processing performed by the arithmetic device 100 will be described below.

Figure 2:
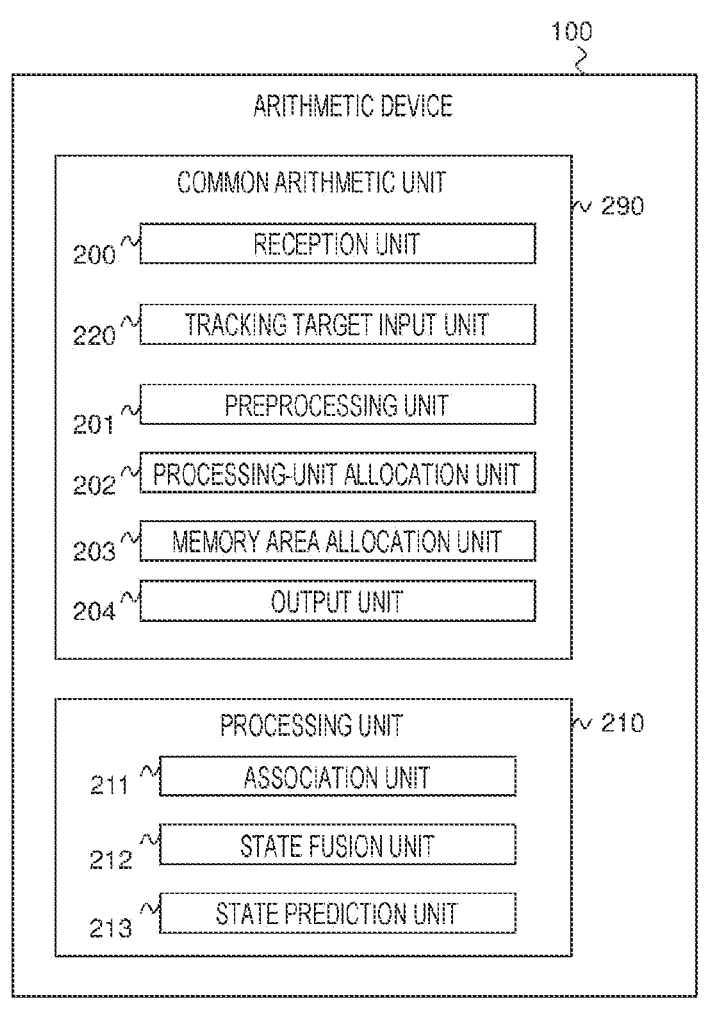
FIG. 2 is a functional block diagram of the arithmetic device.

FIG. 2 is a functional block diagram in which functions included in the arithmetic device 100 are illustrated as functional blocks. The arithmetic device 100 includes, as functions thereof, a common arithmetic unit 290 and the processing unit 210. The common arithmetic unit 290 includes a reception unit 200, a tracking target input unit 220, a preprocessing unit 201, a processing-unit allocation unit 202, a memory area allocation unit 203, and the output unit 204. The processing unit 210 includes an association unit 211, a state fusion unit 212, and a state prediction unit 213. The correspondence between FIG. 2 and FIG. 1 will be described. The common arithmetic unit 90 in FIG. 2 is realized by the common resource 280 in FIG. 1, and the processing unit 210 in FIG. 2 corresponds to the processing unit 210 in FIG. 1.

In other words, the processing unit 210, that is, the association unit 211, the state fusion unit 212, and the state prediction unit 213 each include a plurality of functional blocks that perform the same processing for parallel processing. For example, the association unit 211 is a generic term in an association unit 211-1, an association unit 211-2, and an association unit 211-P. For example, the association unit 211 corresponds to a "class" in an object-oriented programming language, and each of the association unit 211-1, the association unit 211-2, and the like, which perform actual parallel processing, corresponds to an "instance" of the association unit 211. The same applies to the relationship between the state fusion unit 212, and a state fusion unit 212-1 and the like, and the relationship between the state prediction unit 213, and a state prediction unit 213-1 and the like. Note that, although not illustrated in FIG. 2, the reception unit 200 and the preprocessing unit 201 each may also include a plurality of functional blocks that perform the same processing.

The reception unit 200 receives information pertaining to a detection target from the sensor 101, and stores it in the shared memory 111. The preprocessing unit 201 performs preprocessing on the state of the detection target stored in the shared memory 111. The preprocessing is, for example, processing for unifying differences in a coordinate system used when the sensor 101 expresses the state of the detection target, or processing for converting data from sensors having different operation timings into data synchronized with the timing of estimation processing.

The tracking target input unit 220 writes the state of a tracking target stored in the distributed memory 112 to the shared memory 111. This predicted state is a state of a tracking target predicted by the state prediction unit 213 in the estimation processing in the previous processing cycle. The processing-unit allocation unit 202 allocates each of the respective states of the detection targets, which are the processing result of the preprocessing unit 201, and each of the tracking targets read by the tracking target input unit 220 to any corresponding one of a plurality of groups. Specifically, the processing-unit allocation unit 202 allocates each target to any corresponding one of the processing units 210-1 to 210-P by using positional information as described later. The processing unit 210 that has been subjected to the allocation is in charge of processing the detection target and the tracking target in parallel processing.

The memory area allocation unit 203 classifies the detection targets output from the preprocessing unit 201 and the tracking targets read by the tracking target input unit 220 into a plurality of groups, and allocates any one of the distributed memories 112 for each group. Note that the detection targets or the tracking targets may be allocated to a plurality of memory areas. As described above, each of the processing units 210 has the predetermined, high-speed accessible corresponding area of the distributed memory 112. Thus, the memory area allocation unit 203 stores information that each of the processing units 210 refers to in the corresponding dedicated distributed memory, which is accessible at high speed from each of the processing units 210 and is a part of the distributed memory 112.

The association unit 211 searches for and associates the same objects on the basis of the state of a detection target and the state of a tracking target. For example, the association unit 211 associates a single detection target detected by the sensor 101 with a single tracking target. The association unit 211 may associate a plurality of detection targets detected by the sensor 101 with a tracking target. The association unit 211 may also associate a plurality of detection targets detected by the sensor 101 with each other, but may not associate the plurality of detection targets with an existing tracking target.

The state fusion unit 212 fuses the respective states of a plurality of objects associated by the association unit 211 to update the state of a tracking target. When the association unit 211 associates any tracking target with one or more detection targets, the state fusion unit 212 updates the state of the tracking target. When the association unit 211 associates a plurality of detection targets with each other and association is not made with an existing tracking target, the state fusion unit 212 newly creates another tracking target, and updates, that is, newly creates, the state of the other tracking target.

The state prediction unit 213 predicts and updates the state of the tracking target in the next processing cycle on the basis of the state of the tracking target updated by the state fusion unit 212, and performs storing in the distributed memory 112. For example, when an assumption is made that uniform linear motion is performed during a time between the current processing cycle and the next processing cycle, the state prediction unit 213 predicts the current position by calculating a movement amount corresponding to the time difference. The output unit 204 outputs the state of the tracking target updated by the state fusion unit 212 to the control device 102.

Figure 3:
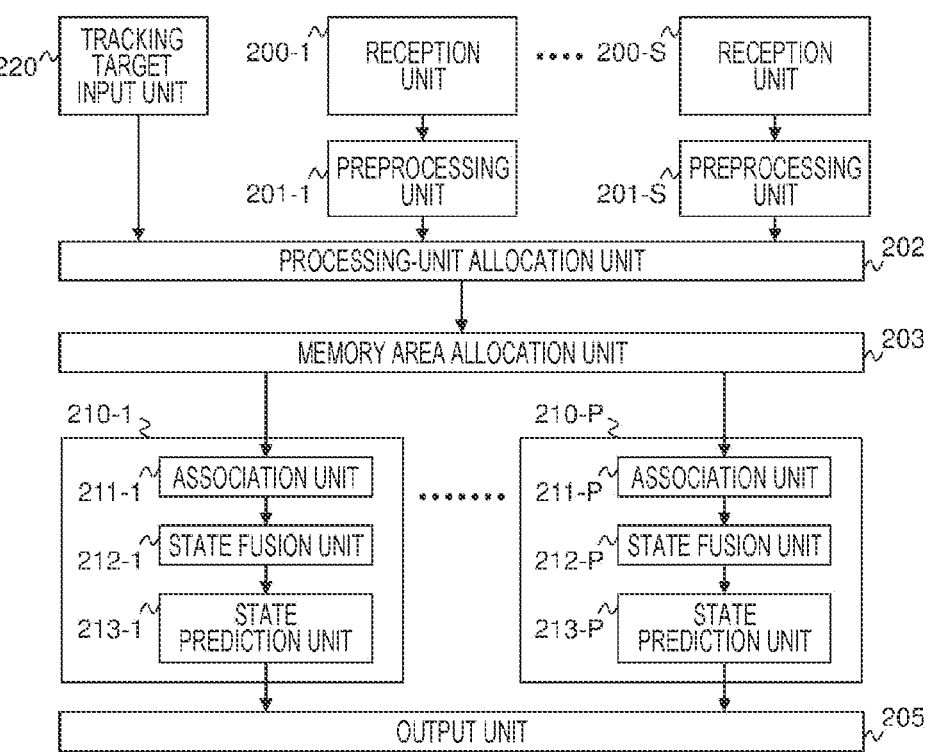
FIG. 3 is a processing flow diagram of estimation processing performed by the arithmetic device.

FIG. 3 is a processing flow diagram of estimation processing performed by the arithmetic device 100. FIG. 3 visually illustrates a correlation between the functional blocks illustrated in FIG. 2. Note that, in FIG. 3, the reception unit 200 and the preprocessing unit 201 each also include a plurality of functional blocks that perform the same processing.

The reception unit 200 receives the state of detection target from the sensor 101, and stores it in the shared memory 111. The processing cycle of each sensor 101 generally does not completely coincide with the processing cycle of the estimation processing, and thus the amount of data read by each reception unit 200 is not constant as described below. That is, a case exists in which data of a plurality of cycles of the sensor 101 is read at a time, while a case exists in which there is no data to be read due to absence of the operation timing of the sensor 101 during the processing cycle of the estimation processing.

The preprocessing unit 201 performs preprocessing on the state of a detection target that has been stored in the shared memory 111 by the reception unit 200. This state of the detection target is to be processed by the processing-unit allocation unit 202. The tracking target input unit 220 reads the state of a tracking target estimated in the previous processing cycle and stored in the distributed memory 112, and writes the state of the tracking target to the shared memory 111. The processing-unit allocation unit 202 reads, from the shared memory 111, the outputs from the tracking target input unit 220 and the preprocessing unit 201, and determines a processing unit that processes each detection target and each tracking target.

The memory area allocation unit 203 writes the state of the detection target and the state of the tracking target stored in the shared memory 111 to the distributed memory 112 on the basis of the determination of the processing-unit allocation unit 202. When the writing to the distributed memory 112 performed by the memory area allocation unit 203 is completed, parallel processing performed by the processing unit 210 is started. The processing performed by the processing unit 210 will be described with reference to FIG. 4.

Figure 4:
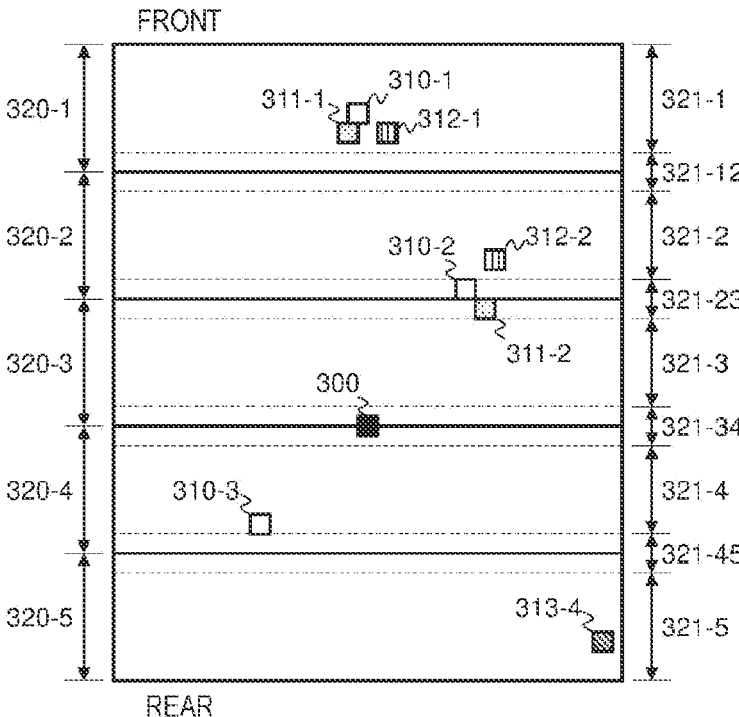
FIG. 4 is a diagram illustrating an example of a host vehicle and external targets.

FIG. 4 is a diagram illustrating an example of the host vehicle and external targets. FIG. 4 illustrates the host vehicle 300 at the center in the drawing and the external situations thereof, where the upper part in the drawing is the front of the host vehicle, and the lower part in the drawing is the rear of the host vehicle. In FIG. 4, reference signs 310-1, 310-2, and 310-3 denote three tracking targets read by the tracking target input unit 220. Reference signs 311, 312, and 313 respectively denote detection targets detected by the first sensor 101-1, the second sensor 101-2, and the third sensor 101-3.

Specifically, the detection targets detected by first sensor 101-1 are targets denoted by reference sign 311-1 and reference sign 311-2. The detection targets detected by the second sensor 101-2 are targets denoted by reference sign 312-1 and reference sign 312-2. The detection target detected by the third sensor 101-3 is a target denoted by reference sign 313-4. Reference sign 320 and reference sign 321 will be described later.

The association unit 211 searches for and associates the same targets on the basis of the state of a detection target and the state of a tracking target. In the example illustrated in FIG. 4, for example, it is determined that targets 311-1 and 312-1 represent the same targets with respect to the tracking target 310-1, and they are associated with one another. For example, a distance of each of the objects is used as a reference for determining whether or not the objects are the same targets. For the calculation of the distance, a Mahalanobis distance, which is a distance considering the influence of an error, may be used. In addition to the distance, a difference in speed or acceleration may also be taken into consideration in determining whether or not the targets are the same targets.

Similarly, the detection target 311-2 and the detection target 312-2 are associated with the tracking target 310-2. There is no detection target associated with the tracking target 310-3. There is also no tracking target associated with the detection target 313-4. The above processing is processing of searching for a tracking target to be associated with each target. Thus, each of the processing units 210 searches for a tracking target to be associated with a target allocated to each of the processing units 210.

The state fusion unit 212 fuses the states of a target and a tracking target associated by the association unit 211 to update the state of the tracking target. For example, the state fusion unit 212 fuses the states of the tracking target 310-1, the target 311-1, and the target 312-1 associated by the association unit 211 to update the state of the tracking target 310-1. In this fusion, methods are used, including a method of simply averaging each state, a method of averaging in consideration of errors included in each state, and a method of weighted averaging in consideration of reliability, that is, existence probability, of each state.

There is no target associated with the tracking target 310-3. Thus, there is a possibility that this tracking target is a target having received false detection in the past, or has moved out of the detection range of the sensor 101. Therefore, it is determined whether or not to delete this tracking target. In this determination, methods can be used, including a method of using, as a reference, the number of times this tracking target has been associated with targets in the past, and a method of separately calculating and managing existence probability.

There is no tracking target associated with the detection target 313-4. Thus, it is determined that the detection target 313-4 is a newly detected target, and a new tracking target is created. The above processing is processing in which states are fused for each tracking target, and the state of the tracking target is updated. Thus, each processing unit performs fusion processing on the predicted state of a tracking target allocated to each processing unit. Note that the association unit 211 and the state fusion unit 212 have different manners in allocation regarding processing units, and thus synchronization in parallel processing may exist between the association unit 211 and the state fusion unit 212.

The state prediction unit 213 predicts the state of the tracking target in the next processing cycle on the basis of the state of the tracking target updated by the state fusion unit 212, and performs storing in the distributed memory 112. Finally, the output unit 204 waits for the end of operation of the processing units 210-1 to 210-P, and outputs the states of the tracking targets updated by the state fusion unit 212.

The allocation in the processing-unit allocation unit 202 and the memory area allocation unit 203 can be performed as follows. In the present embodiment, grouping is performed by using positional information of objects as described below.

The processing performed by each processing unit 210 is processing of searching for objects close to each other among a plurality of targets or tracking targets and fusing them. Thus, high speed processing can be achieved by allowing an object that each of the processing units 210 searches for to be stored in a corresponding dedicated distributed memory for the one of the processing units 210 in advance by using simple determination. As described above, this is because the access to the corresponding dedicated distributed memory made by each processing unit 210 is faster than the access to the other connected distributed memory or the shared memory 111.

In the example illustrated in FIG. 4, when the position of the host vehicle is a reference position, the width direction of the host vehicle 300 has no limitation, as can be seen in an area 320-1 to an area 320-5, and areas obtained by division in the traveling direction of the host vehicle 300 are defined. That is, each area illustrated in FIG. 4 has a rectangular shape whose longitudinal direction is the width direction of the host vehicle 300. As illustrated in FIG. 4, information for dividing an area on the basis of the host vehicle 300 (hereinafter referred to as "area division information") is determined in advance, and is stored in a storage unit, which is not illustrated, of the arithmetic device 100. An example of the area division information is information on the shape and size of a plurality of rectangles illustrated in FIG. 4. The area division information is also information indicating the shapes of areas, and thus it can be also said as information of an "area pattern".

The processing-unit allocation unit 202 allocates a detection target or a tracking target existing in each area to each processing unit 210 on the basis of the area division information. For example, the tracking target 310-1, the detection target 311-1, and the detection target 312-1 exist in the area 320-1, and thus they are allocated to the processing unit 210-1. Although the memory area allocation unit 203 can similarly allocate memory areas, special attention is needed near the boundary of areas. A specific description will be given with reference to the example in FIG. 4.

In the example illustrated in FIG. 4, the tracking target 310-2 and the detection target 312-2 exist in the area 320-2, and thus they are allocated to the processing unit 210-2. The detection target 311-2 exists in the area 320-3, and thus it is allocated to the processing unit 210-3. At this time, in the processing on the detection target 311-2, the detection target 311-2 needs to be associated with the tracking target 310-2. Thus, the processing unit 210-3 in charge of the processing on the detection target 311-2 must have access to the data of the tracking target 310-2.

To achieve this, memory areas are allocated by dividing a space, as can be seen in the area 321. That is, the memory area allocation unit 203 stores information pertaining to the objects included in an area 321-1 and an area 321-12, in the dedicated distributed memory for the processing unit 210-1. The memory area allocation unit 203 stores information pertaining to the objects included in the area 321-12, an area 321-2, and an area 321-23, in the dedicated distributed memory for the processing unit 210-2. The memory area allocation unit 203 stores information pertaining to the objects included in the area 321-23, an area 321-3, and an area 321-34, in the dedicated distributed memory for the processing unit 210-3. The memory area allocation unit 203 stores information pertaining to the object included in the area 321-34, an area 321-4, and an area 321-45, in the dedicated distributed memory for the processing unit 210-4. The memory area allocation unit 203 stores information pertaining to the object included in the area 321-45 and an area 321-5, in the dedicated distributed memory for the processing unit 210-5.

As described above, the memory area allocation unit 203 stores information pertaining to an object existing at the boundary of areas, in a plurality of dedicated distributed memories. Note that the memory area allocation unit 203 may store the information pertaining to the object existing at the boundary of the areas, in the shared memory 111. When the information illustrated in FIG. 4 is restated in a different way, solid lines indicate an area in which an object to be referred to by the processing-unit allocation unit 202 and to be searched for by the processing unit 210 exists. Dashed lines in FIG. 4 are referred to by the memory area allocation unit 203, and are used for determining which memory is used for storing. The interval between the solid line and the dashed line is a predetermined distance, for example, 0.5 m or 1.0 m.

According to the first embodiment described above, the following operation and effects can be obtained.

(1) The arithmetic device 100 includes the reception unit 200 to which information pertaining to a detection target that is a target recognized by the sensor 101 is input from the sensor 101, the processing-unit allocation unit 202 that allocates a plurality of targets to any one of a plurality of groups, the association unit 211 that retrieves a second target to be associated with a first target from a part of the plurality of groups included in the plurality of groups, and the state fusion unit 212 that fuses the first target and the second target that have been associated with each other by the association unit 211 to produce a tracking target that is a target being tracked. The first target is any one of the detection target and the tracking target, and the second target is any one of the detection target and the tracking target. Thus, the target to be retrieved by the association unit 211 is limited, and therefore the processing can be accelerated.

(2) The arithmetic device 100 includes a plurality of processing units 210 each of which includes the association unit

211 and the state fusion unit 212. The processing-unit allocation unit 202 allocates the group to each of the processing units 210. Each of the plurality of processing units 210 operates the association unit 211 and the state fusion unit 212, in parallel with the other ones of the processing units 210. Thus, the processing of the arithmetic device 100 can be accelerated by the parallel processing.

(3) The processing-unit allocation unit 202 determines the group to which the allocating is made in accordance with positional information of the target. The same targets are expected to be observed at substantially the same position regardless of which sensor 101 measures the same targets, and thus the same targets can be efficiently retrieved by performing grouping on the basis of the position.

(4) The processing units 210 include respective dedicated distributed memories each of which is a dedicated memory readable at high speed. The arithmetic device 100 includes the memory area allocation unit 203 that copies information of the group to be retrieved by the first processing unit 210-1 to the first distributed memory 112-1 included in the first processing unit 210-1. Each of the processing units 210 reads information pertaining to the target from the corresponding one of the respective dedicated distributed memories included in the processing units 210, and processes the information pertaining to the target. Thus, each of the processing units 210 mainly accesses the corresponding dedicated distributed memory that can be read at high speed, and therefore the time required for reading can be shortened, thereby accelerating the processing.

First Modification

In the first embodiment described above, it has been described that area division information is a predetermined value, that is, a fixed value. However, area division information may be dynamically set. For example, the processing-unit allocation unit 202 may set area division information such that the total number or detection targets and tracking targets is substantially equal in each area.

Figure 5:
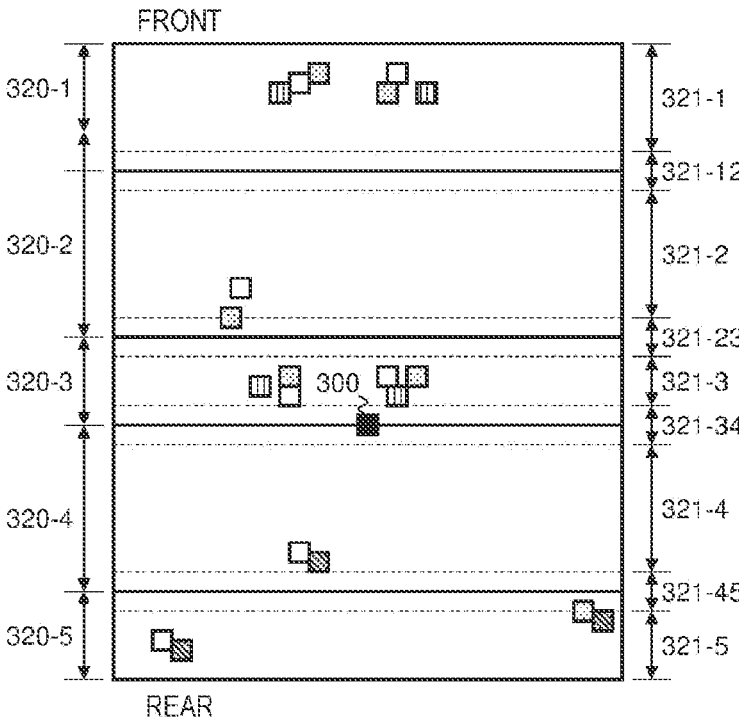
FIG. 5 is a diagram illustrating a dynamic setting of area division in a first modification.

FIG. 5 is a diagram illustrating a dynamic setting of area division in a first modification. In the example illustrated in FIG. 5, many targets exist in the vicinity of the front of the host vehicle 300. The processing-unit allocation unit 202 shifts the boundary between the area 302-2 and the area 303-3 toward the rear side as compared with the boundary in the case of FIG. 4 such that these targets are distributed substantially equally to both the area 302-2 and the area 303-3.

In the present modification, the following operation and effect can be obtained.

(5) As illustrated in FIG. 5, the processing-unit allocation unit 202 determines a threshold value of the positional information of the target that is used for determining the group on the basis of positional information of the plurality of targets. That is, the processing time of each of the processing units 210 can be substantially equal by making the number of targets existing in each area substantially equal, and thus the time required for the entire processing can be shortened. If the number of targets included in areas is biased, variation increases in the processing time of each of the processing units 210. The presence of the processing unit 210 having the longest processing time causes the operation of the output unit 204 to delay. However, according to the present modification, the number of objects processed by each of the processing units 210 is substantially equal, and thus the processing time also tends to be equal, therefore shortening the entire processing time.

Second Modification

In the first embodiment described above, different processing units 210 are allocated to respective areas divided by the area division information. However, a plurality of areas may be allocated to a single one of the processing units 210. In this case, it is preferable that a plurality of areas geographically continuous with each other is allocated to the single processing unit 210. For example, in the example illustrated in FIG. 4, in a case where the processing unit 210 in charge of the area 230-5 is provided with another area in charge, it is preferable that this processing unit 210 is also in charge of the area 320-4, which is geographically continuous, rather than the area 320-3, which is not geographically continuous.

Third Modification

When there is no detection target associated with a tracking target, the detection range of the sensor 101 may be calculated to determine whether or not the position of the tracking target estimated in the immediately preceding processing cycle is within the detection range of the sensor 101. Then, when there is no detection target even though the position of the tracking target is within the detection range of sensor 101, it is determined that the past detection is false detection, and information pertaining to the tracking target is deleted. When the position of the tracking target is out of the detection range of the sensor 101, there is a possibility that the target cannot be detected temporarily and the same target may be detected later. Thus, the information pertaining to the tracking target is stored without being deleted.

Fourth Modification

The arithmetic device 100 may include only one processing unit 210. In this case, the processing-unit allocation unit 202 performs grouping of targets on the basis of area division information, and the processing unit 210 performs processing sequentially for each group. The memory area allocation unit 203 stores information pertaining to a target to be processed, in the dedicated distributed memory, each time the group to be processed by the processing unit 210 is changed. In the present modification, the arithmetic operation may be performed by using only the shared memory 100 while the dedicated distributed memory is not used.

Second Embodiment

A second embodiment of the arithmetic device will be described with reference to FIG. 6. In the following description, the same components as those in the first embodiment are denoted by the same reference signs, and differences will be mainly described. The points not specifically described are the same as those in the first embodiment. The present embodiment is different from the first embodiment mainly in that the shape of areas divided by area division information is vertically long. However, the present embodiment is similar to the first embodiment in that the positional information of a target is included in the state of the target and grouping is performed by using the positional information of objects.

Figure 6:
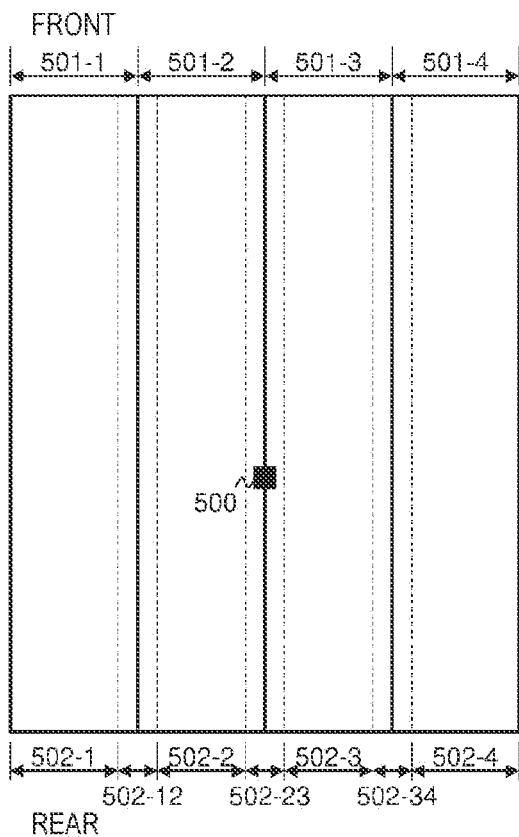
FIG. 6 is a diagram illustrating areas divided by area division information, in a second embodiment.

FIG. 6 is a diagram illustrating areas divided by area division information, in the second embodiment. The areas in the present embodiment have no limitation in the traveling direction of the host vehicle 300, and the areas obtained by division in the width direction of the host vehicle 300 are defined. That is, each area illustrated in FIG. 4 has a rectangular shape whose longitudinal direction is the traveling direction of the host vehicle 300. The interval between the solid line and the dashed line is a predetermined distance as in the first embodiment.

The processing-unit allocation unit 202 allocates a detection target or a tracking target existing in each of an area 501-1 to an area 501-4 to a corresponding one of the processing unit 210-1 to the processing unit 210-4. The memory area allocation unit 203 stores information pertaining to the objects existing in an area 502-1 to an area 502-4, in the respective dedicated distributed memories for the processing unit 210-1 to the processing 210-4. Information pertaining to an object existing in an area 502-12 may be stored in the respective dedicated distributed memories for the processing unit 210-1 and the processing unit 210-2, or may be stored in the shared memory 111. Information pertaining to an object existing in an area 502-23 may be stored in the respective dedicated distributed memories for the processing unit 210-2 and the processing unit 210-3, or may be stored in the shared memory 111. Information pertaining to an object existing in an area 502-34 may be stored in the respective dedicated distributed memories for the processing unit 210-3 and the processing unit 210-4, or may be stored in the shared memory 111.

According to the second embodiment described above, the area division as illustrated in FIG. 6 can reduce lateral association and retrieval processing. A large difference exists between the host vehicle traveling lane and the opposite lane in terms of relative speed of another vehicle, and thus there is a case in which different association and fusion processing methods are used. In this case, with the division in the lateral direction, parallel processing can be performed while different types of processing are allocated for each area. When a right or left turn is made at an intersection or the like, there is a case in which a priority is given to recognition information processing for a right or left turn destination. In this case, it is possible to perform allocation of processing units in consideration of the difference in the allocation processing.

Third Embodiment

A third embodiment of the arithmetic device will be described with reference to FIG. 7. In the following description, the same components as those in the first embodiment are denoted by the same reference signs, and differences will be mainly described. The points not specifically described are the same as those in the first embodiment. The present embodiment is different from the first embodiment mainly in that areas divided by area division information have a grid shape. However, the present embodiment is similar to the first embodiment in that the positional information of a target is included in the state of the target and grouping is performed by using the positional information of objects.

Figure 7:
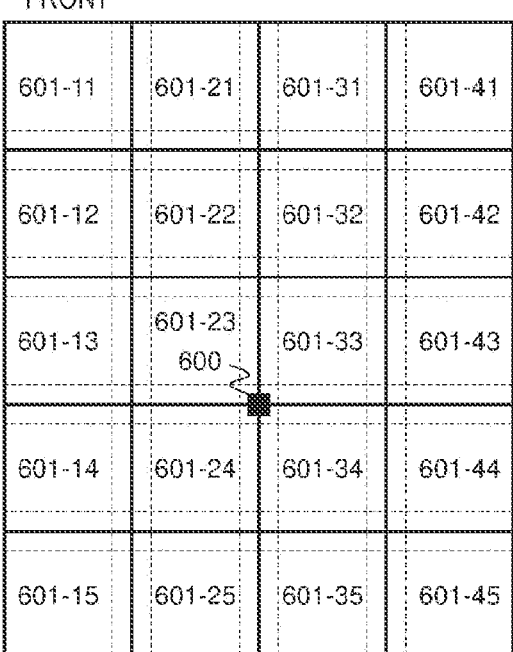
FIG. 7 is a diagram illustrating areas divided by area division information, in a third embodiment.

FIG. 7 is a diagram illustrating areas divided by area division information, in the third embodiment. The areas in the present embodiment are grid-shaped areas divided by straight lines parallel to the traveling direction of the host vehicle 300 and straight lines parallel to the width direction of the host vehicle. The interval between the solid line and the dashed line is a predetermined distance as in the first embodiment. Respective objects existing in areas 601 divided by the solid lines in FIG. 7 are allocated as objects to be processed for individual processing units 210.

Although in FIG. 7, reference signs are omitted for convenience of illustration, areas indicated by dashed lines are referred to by the memory area allocation unit 203 for determining memories for storing information pertaining to objects, as in the first embodiment. Note that four areas are adjacent in the present embodiment, and thus information pertaining to the same object may be stored in four dedicated distributed memories. In the division illustrated in FIG. 7, 20 areas exist. Thus, for example, five areas can be allocated for each processing unit when four processing units exist.

According to the third embodiment described above, the area can be divided with a variation different from that in the first embodiment or the second embodiment.

Modification of Third Embodiment

A priority may be set for areas divided by area division information, and processing may be simplified for an area having a low priority. For example, areas 601-11, 601-41, 601-15, 601-45 in FIG. 7 are locations farthest from the host vehicle 600, and have relatively low importance is recognizing a target. These four areas are set in advance to "priority: low" indicating a relatively low priority, and the other areas are set in advance to "priority: high" indicating a relatively high priority.

The arithmetic device 100 may simplify processing content in advance for these areas having a low priority, or may switch to simplified processing when it is determined that a processing load is high at the processing timing for these areas. The simplified processing includes, for example, a method in which determination is made that no detection target exists in the areas at that timing, and a method in which a new tracking target is created from all the detection targets without performing association with the detection targets.

According to the present modification, the following operation and effect can be obtained.

(6) A priority set for each of the groups. The association unit 211 simplifies processing for a group for which the priority is set low. Thus, it is possible to avoid delay in the entire processing caused by slow processing for an area having low importance.

Fourth Embodiment

A fourth embodiment of the arithmetic device will be described with reference to FIG. 8. In the following description, the same components as those in the first embodiment are denoted by the same reference signs, and differences will be mainly described. The points not specifically described are the same as those in the first embodiment. The present embodiment is different from the first embodiment mainly in that division of an area is further devised.

Figure 8:
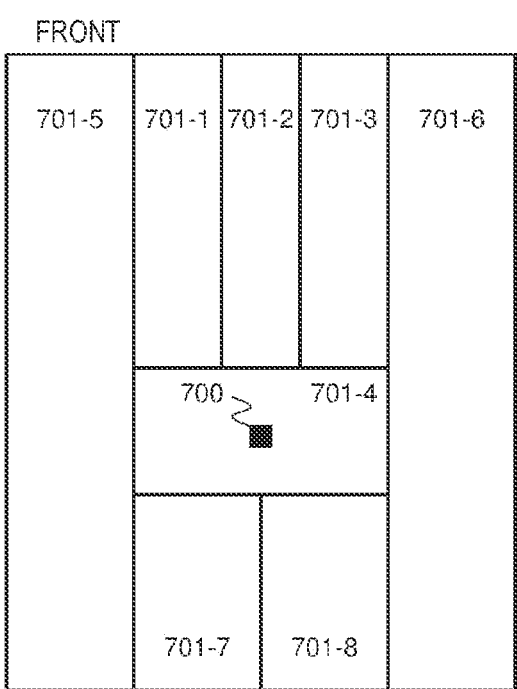
FIG. 8 is a diagram illustrating areas divided by area division information, in a fourth embodiment.

FIG. 8 is a diagram illustrating areas divided by area division information, in the fourth embodiment. The division of the areas illustrated in FIG. 8 is made by dividing and integrating the areas illustrated in FIG. 4 in the first embodiment in accordance with importance of recognition. For traveling of a host vehicle 700, the vicinity of the host vehicle and the front of the host vehicle are areas having high importance, and thus processing on targets existing in these areas is given the highest priority. Thus, it is necessary to complete estimation processing even when many targets exist in these areas having high importance.

To respond to this request, the areas are set such that processing loads are distributed in an area 701-1 to an area 704-4, which are areas that are located in the vicinity of the host vehicle 700 or in the front of the host vehicle 700, and that have high importance. In the remaining areas, 701-5 to an area 701-8 are set. That is, the area 701-5 and the area 701-6 are set so as to be large because the sides and the distant place of the host vehicle 700 have low importance. The rear area of the host vehicle 700 also has importance lower than the front area thereof, and thus the front area of the host vehicle 700 is divided into three areas, while the rear area thereof is divided into two areas to form the area 701-7 and the area 701-8. Although dashed lines are not illustrated in FIG. 8 for convenience of illustration, the dashed lines exist at a predetermined distance from the boundaries of the areas as in the first embodiment or the third embodiment.

Even when a processing load is high, it is possible to complete processing for the areas having a high priority within a predetermined time by allocating the area 701-1 to the area 704-4 having a high priority to the different ones of the processing unit 210-1 to the area 210-4. Although the area 701-5 to the area 701-8 can be also allocated to the processing units 210-1 to 210-4, a priority given to processing for the processing units 701-1 to 701-4 having a high priority. By setting the areas and allocating the processing units as described above, the priority of the processing can be set.

According to the fourth embodiment described above, an area can be set such that the area becomes smaller as the area has higher importance on the basis of the positional relationship with the host vehicle.

Fifth Embodiment

A fifth embodiment of the arithmetic device will be described with reference to FIG. 9. In the following description, the same components as those in the first embodiment are denoted by the same reference signs, and differences will be mainly described. The points not specifically described are the same as those in the first embodiment. The present embodiment is different from the first embodiment mainly in that areas are matched with detection ranges of the sensors.

Figure 9:
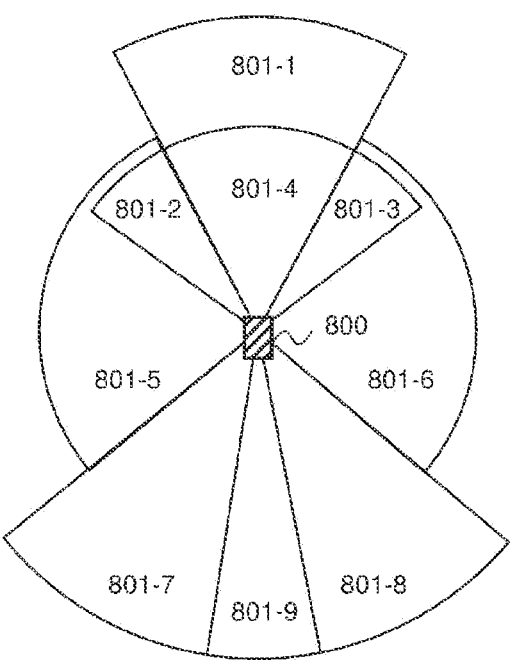
FIG. 9 is a diagram illustrating areas divided by area division information, in a fifth embodiment.

FIG. 9 is a diagram illustrating areas divided by area division information, in the fifth embodiment. A sector-shaped area illustrated in FIG. 9 indicates a detection area of each sensor. The sensors and their detection areas are exemplified as follows. The sensor 101-1 is a long-range radar, and an area 801-1 and an area 801-4 are detection areas thereof. The sensor 101-2 is a camera sensor, and an area 801-2, an area 802-3, and the area 802-4 are detection areas thereof. The sensor 101-3 is a radar attached to the left front side, and the area 801-2 and an area 801-5 are detection areas thereof. The sensor 101-4 is a radar attached to the right front side, and the area 801-3 and an area 801-6 are detection areas thereof. The sensor 101-5 is a radar attached to the left rear side, and an area 801-7 and an area 801-9 are detection areas thereof. The sensor 101-6 is a radar attached to the right rear side, and an area 801-8 and the area 801-9 are detection areas thereof.

Although dashed lines are not illustrated in FIG. 9 for convenience of illustration, the dashed lines exist at a predetermined distance from the boundaries of the areas as in the first embodiment or the third embodiment.

According to the fifth embodiment described above, the following operation and effect can be obtained.

(7) Information pertaining to detection targets is input to the reception unit 200 from a plurality of sensors. The processing-unit allocation unit 202 determines the group to which the allocating is made in accordance with a detection range of each of the plurality of sensors 101 and the positional information of the target. Thus, the area can be divided with a variation different from those in the first to fourth embodiments.

Sixth Embodiment

A sixth embodiment of the arithmetic device will be described. In the following description, the same components as those in the first embodiment are denoted by the same reference signs, and differences will be mainly described. The points not specifically are the same as those in the first embodiment. The present embodiment is different from the first embodiment mainly in that positional information is not used for grouping of objects.

In the present embodiment, the processing-unit allocation unit 202 performs grouping, that is, performs allocation of processing units by using information other than positional information of objects. The memory area allocation unit 203 determines a memory for storing information pertaining to an object by using information other than positional information of an object. The information other than positional information is, for example, speed, acceleration, size, and a type. Note that the type of object refers to a four-wheeled vehicle, a two-wheeled vehicle, a pedestrian, or the like. This is because the same objects are expected to have substantially the same speed, acceleration, and size.

For example, targets having greatly different speeds are less likely to be the same targets, and thus they are not targets to be retrieved as targets to be associated. Therefore, it is reasonable that division is made on the basis of the speed of a target. As a first example of using speed, grouping can be performed on the basis of whether the relative speed of a target is positive or negative by evaluating the relative speed of the target with respect to the host vehicle. As a second example of using speed, grouping can be performed on the basis of whether or not traveling directions of a target and the host vehicle are the same by calculating a product of the speed vector of the target and the speed vector of the host vehicle. Division can be made on the basis of the size of a target, or division can be made by using the type of target.

According to the sixth embodiment described above, grouping can be performed from a viewpoint different from the viewpoints of the first to fifth embodiments.

Modification of Sixth Embodiment

In the first to fifth embodiments, the positional information is used for grouping of objects, and in the sixth embodiment, the information other than positional information is used for grouping of objects. However, positional information and information other than positional information may be used for grouping of objects. For example, positional information and speed information may be combined. A specific description will be given with reference to FIG. 3 in the first embodiment.

The processing-unit allocation unit 202 chooses an object that exists in the area 320-1 and whose relative speed with respect to the host vehicle is equal to or more than zero to be an object to be processed by the first processing unit 210-1. The processing-unit allocation unit 202 also chooses an object that exists in the area 320-1 and whose relative speed with respect to the host vehicle is less than zero, that is, is negative to be an object to be processed by the second processing unit 210-2. The memory area allocation unit 203 stores information pertaining to the object that exists in the area 320-1 and whose relative speed with respect to the host vehicle is equal to or more than zero, in the first distributed memory 112-1. The memory area allocation unit 203 also stores information pertaining to the object that exists in the area 320-1 and whose relative speed with respect to the host vehicle is less than zero, in the second distributed memory 112-2.

Seventh Embodiment

A seventh embodiment of the arithmetic device will be described with reference to FIGS. 10 and 11. In the following description, the same components as those in the first embodiment are denoted by the same reference signs, and differences will be mainly described. The points not specifically described are the same as those in the first embodiment. The present embodiment is different from the first embodiment mainly in a hardware configuration, and operation of the memory area allocation unit 203.

Figure 10:
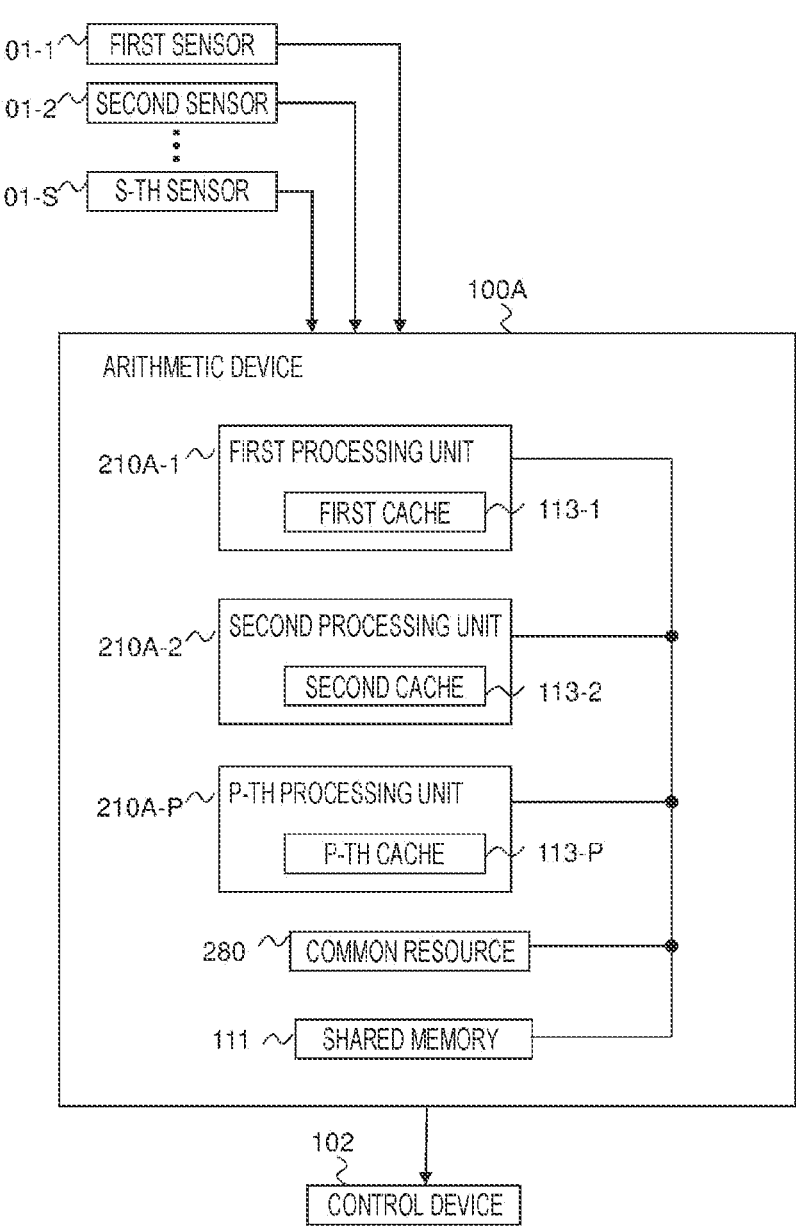
FIG. 10 is a hardware configuration diagram of an arithmetic device in a seventh embodiment.

FIG. 10 is a hardware configuration diagram of an arithmetic device 100A in the seventh embodiment. The arithmetic device 100A includes at least one processing unit 210A, the common resource 280, and the shared memory 111. Note that the at least one processing unit 210A includes one or more processing units 210A, and these components are represented by branch numbers. The processing units 210A include a first processing unit 210A-1, a second processing unit 210A-2, and a P-th processing unit 210-PA. Each of the processing units 210A includes a high-speed accessible cache 113. The cache 113 is, for example, a cache memory such as an L1 cache or an L2 cache of a CPU. The cache 113 is not accessible from the other ones of the processing units.

When each processing unit 210A refers to information stored in the shared memory 111, each processing unit 210A checks whether accumulation is present or absent in the corresponding cache 113, and accesses the shared memory 111 only when the accumulation is absent in the corresponding cache 113. Then, the processing unit 210A reads information in a predetermined block size including necessary information, from the shared memory 111, and writes the information to the cache 113. The predetermined block size is, for example, the same as the size of the cache 113.

The memory area allocation unit 203 classifies detection targets output from the preprocessing unit 201 and tracking targets read by the tracking target input unit 220 into a plurality of groups, and performs storing for each group in a predetermined area of the shared memory 111. The preprocessing unit 201 and the tracking target input unit 220 write the processing result to the shared memory 111, and thus it can be said that the processing performed by the memory area allocation unit 203 is processing in which information written in the shared memory is copied in the same shared memory 111.

The area of each group to which the memory area allocation unit 203 performs writing in the shared memory 111 is a consecutive address area at least in the group. An address of one group and an address of another different group are also preferably consecutive. However, it is preferable that the memory area of each group is fixed, and it is preferable that information is stored in the area from the head without forming a gap, for example.

Figure 11:
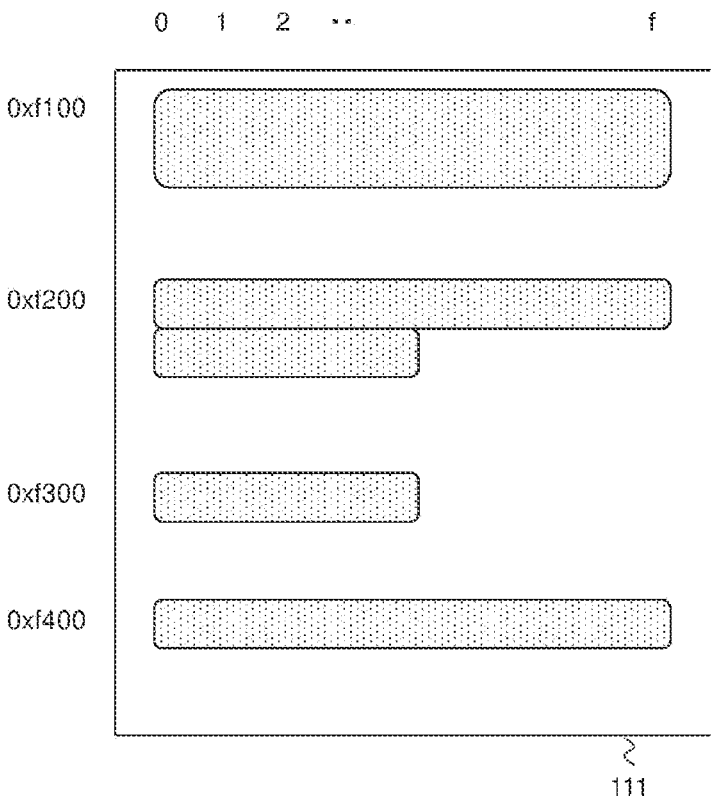
FIG. 11 is a diagram illustrating a memory map of a shared memory in the seventh embodiment.

FIG. 11 is a memory map illustrating a state of the shared memory 111 after the memory area allocation unit 203 arranges information. In this memory map, addresses "0xf100 to 0xf4ff" are indicated. In this memory map, areas in which information stored are indicated by hatching. In the example illustrated in FIG. 11, information pertaining to an object included in the area 321-1 is stored in an area in which the address "0xf100" is the head, and information pertaining to an object included in the area 321-12 is stored in areas in which the address "0xf200" is the head. Information pertaining to an object included in the area 321-2 is stored in an area in which the address "0xf300" is the head, and information pertaining to an object included in the area 321-23 is stored in an area in which the address "0xf400" is the head.

According to the seventh embodiment described above, the following operation and effect can be obtained.

(8) The arithmetic device 100 includes the shared memory 111 accessible from each of the processing units 210. The arithmetic device 100 includes the memory area allocation unit 203 that stores information of the plurality of groups at addresses consecutive for each group in the shared memory 111. Each of the processing units 210 includes the cache 113 that is a cache memory. Each of the processing units 210 continuously reads information pertaining to the target in a predetermined block size when each of the processing units 210 reads the information pertaining to the target from the shared memory 111, and stores the information pertaining to the target in the cache 113. Thus, when the processing unit 210 accesses the shared memory 111, the cache hit ratio increases. This reduces frequency, at which the processing unit 210 accesses the shared memory 111, which is slower than the arithmetic cycle. As a result, the processing speed of the processing unit 210 increases.

Eighth Embodiment

An eighth embodiment of the arithmetic device will be described. In the following description, the same components as those in the first embodiment are denoted by the same reference signs, and differences will be mainly described. The points not specifically described are the same as those in the first embodiment. The present embodiment is different from the first embodiment mainly in that area division information is selectively used.

The processing-unit allocation unit 202 according to the present embodiment has a plurality of patterns of area division information. The plurality of patterns is, for example, the five patterns illustrated in FIGS. 4, and 6 to 9. The processing-unit allocation unit 202 selects and uses any one pattern of the area division information in accordance with the surrounding environment of the host vehicle. The processing-unit allocation unit 202 may obtain information of the surrounding environment of the host vehicle from the sensor 101, or may use, in a combined manner, a self-position obtained by a not-illustrated sensor such as, for example, a satellite navigation system, and map information. The surrounding environment of the host vehicle is at least one of a type of road on which the host vehicle is traveling, the number of traveling lanes, division regarding whether or not a road is one-way, the speed of a surrounding vehicle, weather, and the condition of a road surface.

According to the eighth embodiment described above, the following operation and effect can be obtained.

(9) The processing-unit allocation unit 202 selects one area pattern from a plurality of area patterns determined in advance in accordance with a surrounding environment, and determines the group to which the allocating is made in accordance with the selected area pattern and the positional information of the target. Thus, the processing-unit allocation unit 202 can divide an area in accordance with the surrounding environment.

In the embodiments and modifications described above, the configuration of the functional blocks is merely an example. Some functional configurations illustrated as separate functional blocks may be integrally configured. Alternatively, the configuration illustrated in one functional block diagram may be divided into two or more functions. Further, some of the functions included in each of the functional blocks may be included in another one of the functional blocks.

The embodiments and the modifications described above may be combined. While the various embodiments and modifications have been described above, the present invention is not limited to these contents. Other aspects conceivable within the scope of the technical idea of the present invention are also included within the scope of the present invention.

REFERENCE SIGNS LIST

90 common arithmetic unit
100, 100A arithmetic device
101 sensor
111 shared memory
112 distributed memory
113 cache
200 reception unit
201 preprocessing unit
202 processing-unit allocation unit
203 memory area allocation unit
204 output unit
210 processing unit
211 association unit
212 state fusion unit
213 state prediction unit
220 tracking target input unit
280 common resource
290 common arithmetic unit

The invention claimed is:

1. An arithmetic device for a vehicle, the device comprising one or more processors configured to:

receive, from a sensor, information pertaining to one or more detection targets each being recognized by the sensor;

group a plurality of targets, including the one or more detection targets and one or more tracking targets, into a plurality of groups, based on positional information of the one or more detection targets and the one or more tracking targets, wherein the one or more tracking targets are detected in a previous cycle and are being tracked, and wherein each group of the plurality of groups corresponds to a spatial area of a plurality of spatial areas each having a priority based on a distance between the spatial area and the vehicle, and the plurality of spatial areas are defined with varying granularity based on the positional information and the priority;

retrieve a second target, of the plurality of targets, to be associated with a first target from a subset of the plurality of groups;

fuse the first target and the second target that are associated with each other to produce a new tracking target that is either (i) a newly created target or (ii) an updated version of the tracking target; and output a control signal to a vehicle control device to control acceleration, deceleration, or steering of the vehicle based on the new tracking target.

2. The arithmetic device according to claim 1, further comprising a plurality of processing units, wherein the one or more processors are configured to:

allocate a corresponding one of the plurality of groups to a corresponding one of the processing units; and cause the corresponding one of the processing units to retrieve the second target to be associated with the first target in the corresponding one of the plurality of groups.

3. The arithmetic device according to claim 1, wherein the one or more processors are configured to group the plurality of targets based on a threshold value of the positional information, the threshold value determined based on a number of the plurality of targets.

4. The arithmetic device according to claim 1, wherein the one or more processors are configured to:

group the plurality of targets based on a detection range of a plurality of sensors and the positional information.

5. The arithmetic device according to claim 1, wherein the one or more processors are configured to:

select one area pattern from a plurality of area patterns determined in advance in accordance with a surrounding environment; and, group the plurality of targets based on the selected area pattern and the positional information.

6. The arithmetic device according to claim 1, wherein the one or more processors are configured to:

simplify processing for a subset of the plurality of groups, the subset corresponding to the spatial area having a lower priority.

7. The arithmetic device according to claim 2, wherein a corresponding one of the plurality of processing units includes respective dedicated distributed memories, wherein the one or more processors are configured to copy information pertaining to the one or more detection targets and one or more tracking targets in the corresponding one of the plurality of groups into the respective dedicated distributed memories of the corresponding one of the plurality of processing units, and wherein each of the processing units is configured to read and process the information pertaining to the one or more detection targets and one or more tracking targets in the corresponding one of the plurality of groups.

8. The arithmetic device according to claim 2, further comprising a shared memory accessible from each of the processing units, wherein the one or more processors are configured to store the information of the plurality of groups at addresses consecutive for each group in the shared memory, wherein each of the processing units includes a cache memory, and wherein each of the processing units is configured to continuously read the information of the plurality of groups in a predetermined block size when each of the processing units reads the information of the plurality of groups from the shared memory, and is configured to store the information of the plurality of groups in the cache memory.

9. An arithmetic method for a vehicle, the method comprising:

receiving, by one or more processors, from a sensor, information pertaining to one or more detection targets each being recognized by the sensor;

grouping, by the one or more processors, a plurality of targets, including the one or more detection targets and one or more tracking targets, into a plurality of groups, based on positional information of the one or more detection targets and the one or more tracking targets, wherein the one or more tracking targets are detected in a previous cycle and are being tracked, and wherein each group of the plurality of groups corresponds to a spatial area of a plurality of spatial areas each having a priority based on a distance between the spatial area and the vehicle, and the plurality of spatial areas are defined with varying granularity based on the positional information and the priority;

retrieving, by the one or more processors, a second target, of the plurality of targets, to be associated with a first target from a subset of the plurality of groups;

fusing, by the one or more processors, the first target and the second target that are associated with each other to produce a new tracking target that is either (i) a newly created target or (ii) an updated version of the tracking target; and outputting a control signal to a vehicle control device to control acceleration, deceleration, or steering of the vehicle based on the new tracking target.

10. The arithmetic device according to claim 1, wherein first spatial areas having a higher priority are defined with finer granularity than second spatial areas having a lower priority, and wherein the first spatial areas are divided into a greater number of spatial areas than the second spatial areas.

* * * * *